Patented Sept. 21, 1954

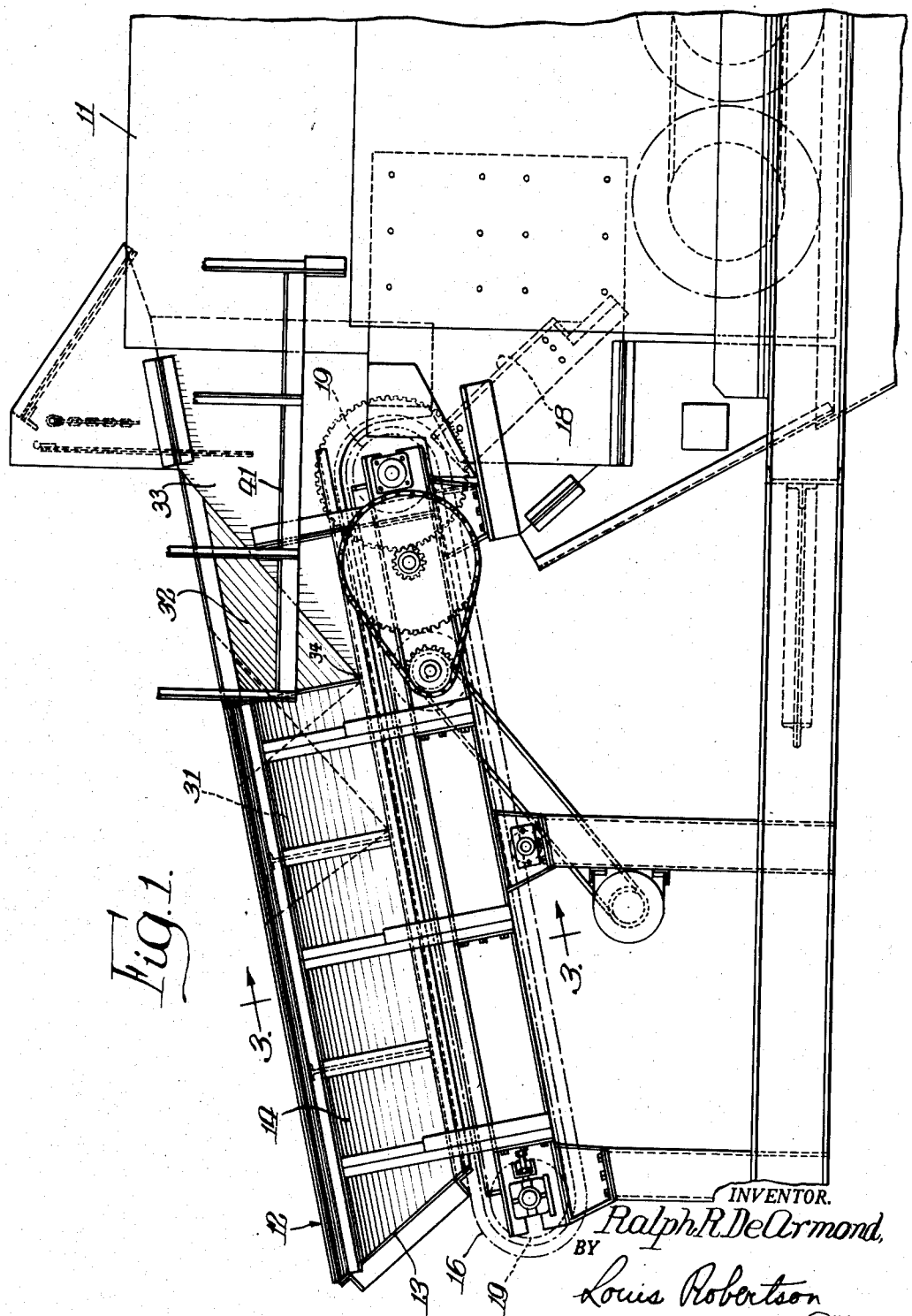

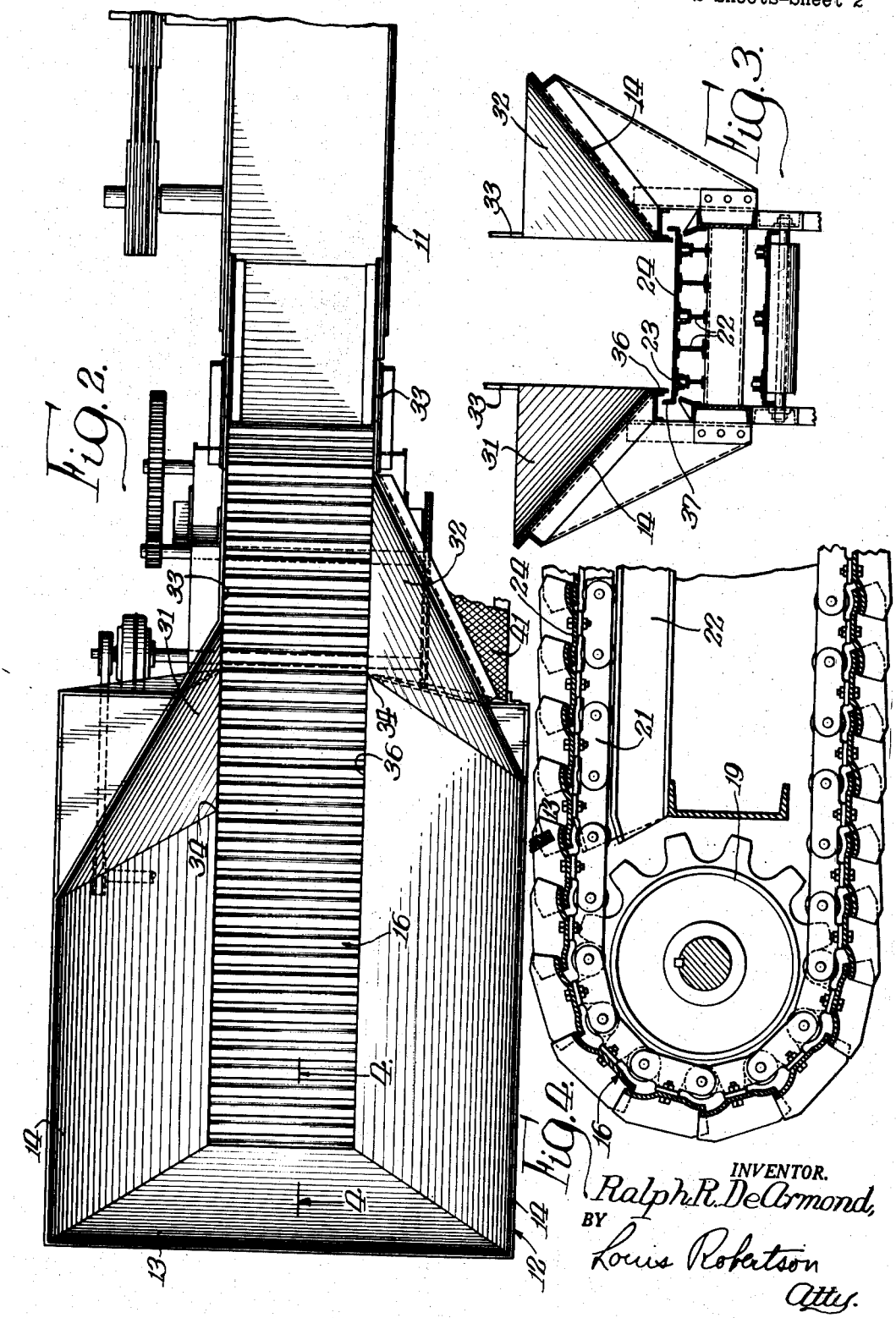

2,689,637

UNITED STATES PATENT OFFICE 2,689,637

ROCK FEEDER

Ralph R. De Armond, Iowa City, Iowa, assignor to Pettibone Mulliken Corporation, Chicago, Ill., a corporation of Delaware Application November 28, 1950, Serial No. 197,930

4 Claims. (Cl. 198—57)

In feeding rock which comes from the quarry to rock crushers there are frequently large pieces which are too large to enter the rock crusher unless turned to a favorable angle. The present invention follows prior practice to some extent. The rock from the quarry has been dumped into a hopper from which it was fed by a conveyor at the bottom thereof to the crusher. As before, the hopper has been provided with forwardly-converging sides or deflectors near its outlet to crowd or twist the rocks so that they would lie within the desired transverse limits. Prior to the present invention, there has been a pronounced tendency for large rocks to jam between these converging sides.

According to the present invention, the twisting of the rock to lie within the required transverse dimensions is facilitated by staggering the deflectors so that to a large extent the rock is crowded from only one side at a time. It has been found that this greatly reduces the number of instances in which the rock jams.

Additional objects and advantages will be apparent from the following description and from the drawings.

Designation of figures

Figure 1 is a side view of the feeder chosen for illustration of the present invention, showing the associated crusher and operator's platform fragmentarily.

Figure 2 is a view looking down on the structure seen in Fig. 1.

Figure 3 is a transverse sectional view, nearly vertical, taken approximately on the line 3—3 of Fig. 1.

Figure 4 is a fragmentary, vertical longitudinal view taken approximately on the line 4—4 of Fig. 2.

General description

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

The invention has been illustrated as embodied in a feeder for delivering rock to a crusher 11. The feeder comprises a hopper 12 into which the rock from the quarry may be dumped, as by truck.

The hopper 12 has a sloping back 13 and sloping sides 14, down which the rock slides to a conveyor 16. The conveyor 16 is preferably of ribbed contour, as shown in Figs. 2 and 4, so that it can exert a very strong feeding force on the rock which rests thereon. The rock is thus carried forwardly and dumped into the crusher 11. With the illustrated form of the crusher, it is dropped by conveyor 16 onto a slide 18, the conveyor passing around sprockets 19.

The conveyor may include endless chains 21, which pass around the spaced sets of sprockets 19 and which, in their load-carrying run, are supported by beams 22. Friction is preferably reduced by rollers 23 (Fig. 3). Each link of chain 21 carries a cross blade or flight 24, which overlaps adjacent plates to present a substantially continuous moving surface.

Deflectors

Near the forward end of the hopper 12 are positioned deflectors 31 and 32. Each of these deflectors, considered alone, is similar to one of the deflectors or forwardly-converging walls used prior to this invention. Thus along its top, deflector 31 extends from the top of the left-hand side wall 14 to the top of a vertical side wall 33. The vertical side walls 33 form a guideway and extend forwardly into the crusher 11. Each is longer along its bottom side than along its top, so that along its bottom side it extends rearwardly to a point 34. Point 34 on the left is a common meeting point for the bottom portion of left vertical wall 33, the lowermost point of deflector 31 and the forwardmost point of left side wall 14. As a matter of fact, there may be (as best seen in Fig. 3) a rearward continuation 36 of the vertical wall 33 all along the bottom of side wall 14. Part 36 is a downwardly bent portion of side wall 14. As will be observed from Fig. 3, the bottom portion of vertical extension 36 (and likewise the bottom portion of side wall 33) extends below the tips of upturned ends 37 of conveyor flights 24, being spaced inwardly therefrom.

The deflector 32 is similarly arranged, although it connects a longer sloping side 14 with a shorter vertical side 33.

According to the present invention, the two deflectors 31 and 32 are substantially staggered longitudinally of the conveyor so that a rock greater than the effective width of the conveyor will almost never strike both deflectors 31 and 32 at once. By "effective width of the conveyor" is meant the distance between vertical side walls 33. Although any appreciable staggering might be helpful, it is preferred to have the amount of staggering illustrated, in which the two deflectors are staggered by approximately one-half or at least 40% of their length longitudinally of the conveyor. Perhaps ideally, they would be staggered their full length so that a transversely-disposed rock could never strike one until it had passed the other. However, it is extremely rare that a single piece of rock has a length more than one-and-one-half times the effective width of the conveyor. If such a rock projects to the left so as to strike deflector 31 and if it rides high so that it continues to engage deflector 31 as long as possible, it will only after this be likely to come into contact with deflector 32. In any event, the amount of staggering illustrated has been found to give very satisfactory results.

The deflectors 31 and 32 may exert three actions, or a combination thereof on a rock. One, especially applicable to a smaller rock, is to slide it transversely. Another is to rotate it about a vertical axis. The third is to raise its projecting end, thus rotating it about a horizontal axis. It will be observed that in the direction of conveyor movement, the deflectors 31 and 32 slope upwardly.

Of course, no feeder handling such huge rocks is likely to be completely free from occasional jamming. In fact, it is customary for an operator to be positioned on a platform 41. Such an operator can control the movement of the conveyor by suitable, conveniently-located buttons. Usually, when he sees a rock starting to jam, he can pry it loose without having to stop the conveyor. This is strenuous work, however, and not always so easily successful. Hence, it is quite important to reduce as far as practical the number of instances in which the rock fails, by action of the conveyor alone, to turn to a position at which it will pass freely into the crusher. This has been accomplished by the simple expedient of staggering the deflectors in accordance with this invention.

One surprising advantage which follows from the staggering of the deflectors is that the great majority of those occasional rocks which jam, jam at the same side of the conveyor, namely, adjacent the second deflector, the deflector 32. This is advantageous because it is then possible for the operator's platform 41 to be positioned at the most advantageous location with respect to this point of most likely jamming.

Although the joints between the sloping upper sides 14 and the deflectors 31 and 32 have been shown as angular, it is preferred that a gradual curve be substituted, at least if the deflectors are as steep as has been illustrated. This is especially desirable in connection with the deflector 32. Extending this deflector rearwardly through a gradual curve considerably reduces the amount of jamming. Such a curve exerts a very gradual camming effect on the rock initially, thus exerting the greatest possible twisting force upon it. Once the rock has started in its twisting movement, it is more easily continued in that movement by the steeper part of the deflector.

Occasionally a large rock will lodge against a deflector and stay there while small rock is dragged under it until more rock comes along which is large enough to exert a sufficient driving force on the lodged rock to slide it along the deflector. During this period the amount of rock fed to the rock breaker may be less than is desired. This can be largely remedied by providing a readily-actuated speed-changing device in the drive of the conveyor 16 so that the conveyor can be speeded up during this period.

I claim:

1. A feeder for feeding to crushers rock including large pieces, said feeder including a conveyor having an irregular contour on its upper face, a hopper having sides converging downwardly toward said conveyor, a guideway having stepper sides spaced more closely than the upper portions of the hopper sides and between which the conveyor carries rock from the hopper to the crusher, and deflectors staggered longitudinally of the conveyor for twisting large rocks as they are moved by the conveyor to a disposition to pass through said guideway, said deflectors sloping upwardly in the direction of conveyor movement to cam moving rocks upwardly.

2. A feeder for feeding to crushers rock including large pieces, said feeder including a conveyor having an irregular contour on its upper face, a hopper having sides converging downwardly toward said conveyor, a guideway having steeper sides spaced more closely than the upper portions of the hopper sides and between which the conveyor carries rock from the hopper to the crusher, and deflectors staggered longitudinally of the conveyor for twisting large rocks as they are moved by the conveyor to a disposition to pass through said guideway, said deflectors being sufficiently staggered so that a rock 50% longer than the width of said guideway will not strike both deflectors simultaneously.

3. A feeder for feeding to crushers rock including large pieces, said feeder including a conveyor having an irregular contour on its upper face, a hopper having sides converging downwardly toward said conveyor, a guideway having steeper sides spaced more closely than the upper portions of the hopper sides and between which the conveyor carries rock from the hopper to the crusher, and deflectors staggered longitudinally of the conveyor for twisting large rocks as they are moved by the conveyor to a disposition to pass through said guideway, said deflectors sloping upwardly in the direction of conveyor movement to cam moving rocks upwardly, and said deflectors being sufficiently staggered so that a rock 50% longer than the width of side guideway will not strike both deflectors simultaneously.

4. A feeder for feeding rock including large pieces, said feeder including a conveyor having an irregular contour on its upper face, a hopper having sides converging downwardly toward said conveyor, a guideway having steeper sides spaced more closely than the upper portions of the hopper sides and between which the conveyor carries rock from the hopper, and deflectors staggered longitudinally of the conveyor for twisting large rocks as they are moved by the conveyor to a disposition to pass through said guideway.

References Cited in the file of this patent

UNITED STATES PATENTS

| Number | Name | Date |
| --- | --- | --- |
| 1,616,101 | Ackley | Feb. 1, 1927 |
| 2,405,636 | Beck | Aug. 13, 1946 |
| 2,543,529 | Baechli | Feb. 27, 1951 |